United States Patent
Unna

(10) Patent No.: US 10,260,369 B2
(45) Date of Patent: Apr. 16, 2019

(54) APPARATUS TO ENABLE ROTATION OF A COMPRESSOR

(71) Applicant: ROLLS-ROYCE PLC, London (GB)

(72) Inventor: Toby E Unna, Sheffield (GB)

(73) Assignee: ROLLS-ROYCE plc, London (GB)

( * ) Notice: Subject to any disclaimer, the term of this patent is extended or adjusted under 35 U.S.C. 154(b) by 458 days.

(21) Appl. No.: 14/988,253

(22) Filed: Jan. 5, 2016

(65) Prior Publication Data
US 2016/0215649 A1    Jul. 28, 2016

(30) Foreign Application Priority Data

Jan. 26, 2015 (GB) .................................. 1501231.3

(51) Int. Cl.
| | | |
|---|---|---|
| F01D 21/00 | (2006.01) | |
| F01D 25/28 | (2006.01) | |
| F01D 25/36 | (2006.01) | |
| F16H 35/18 | (2006.01) | |
| F16M 13/02 | (2006.01) | |
| F01D 5/00 | (2006.01) | |

(52) U.S. Cl.
CPC ......... *F01D 21/003* (2013.01); *F01D 25/285* (2013.01); *F01D 25/36* (2013.01); *F16H 35/18* (2013.01); *F16M 13/02* (2013.01); *F01D 5/005* (2013.01); *F05D 2230/72* (2013.01)

(58) Field of Classification Search
CPC ......... F01D 21/003; F01D 25/36; F16H 35/18
See application file for complete search history.

(56) References Cited

U.S. PATENT DOCUMENTS

| | | | | |
|---|---|---|---|---|
| 5,599,172 A | * | 2/1997 | McCabe | ............... F03D 1/04 417/334 |
| 5,644,394 A | * | 7/1997 | Owens | ............... B23P 6/002 15/324 |
| 5,781,007 A | * | 7/1998 | Partika | ............... G01N 27/9013 324/220 |
| 9,719,368 B2 | * | 8/2017 | Ticehurst | ............... F01D 21/003 |
| 2009/0044665 A1 | * | 2/2009 | Smart | ............... F01D 25/34 81/52 |
| 2013/0269426 A1 | * | 10/2013 | Remillard | ............... F01D 5/005 73/112.01 |

(Continued)

FOREIGN PATENT DOCUMENTS

| | | |
|---|---|---|
| GB | 1296534 A | 11/1972 |
| GB | 2033973 A | 5/1980 |

(Continued)

OTHER PUBLICATIONS

Jun. 23, 2015 Search Report issued in British Patent Application No. 1501231.3.

(Continued)

*Primary Examiner* — Woody A Lee, Jr.
(74) *Attorney, Agent, or Firm* — Oliff PLC

(57) ABSTRACT

Apparatus to enable rotation of a compressor, the apparatus comprising: a guide for insertion through a fan of a gas turbine engine to the compressor, the guide including: a surface arranged to guide a drive assembly through an interior portion of the gas turbine engine to the compressor; and a first fastener arranged to fasten the guide to the gas turbine engine.

18 Claims, 15 Drawing Sheets

(56) References Cited

U.S. PATENT DOCUMENTS

| | | | | |
|---|---|---|---|---|
| 2014/0326058 A1* | 11/2014 | Broughton | ............ | G01M 15/14 |
| | | | | 73/112.01 |
| 2015/0275770 A1* | 10/2015 | Emmons | .................... | F02C 9/22 |
| | | | | 415/150 |
| 2016/0230592 A1* | 8/2016 | Saenz | .................... | F01D 25/002 |
| 2017/0115183 A1* | 4/2017 | Bianchi | ................. | G01M 15/14 |

FOREIGN PATENT DOCUMENTS

| | | | | |
|---|---|---|---|---|
| GB | 1594354 A | | 7/1981 | |
| GB | 2394523 A | * | 4/2004 | ............. F01D 25/36 |

OTHER PUBLICATIONS

Jun. 17, 2016 Search Report issued in European Patent Application No. 16150200.

* cited by examiner

APPARATUS TO ENABLE ROTATION OF A COMPRESSOR

TECHNOLOGICAL FIELD

The present disclosure concerns apparatus to enable rotation of a compressor.

BACKGROUND

Gas turbine engines may be used to power various systems. For example, gas turbine engines may be used to power aircraft, ships and electrical generators. During servicing of gas turbine engines, an engineer may wish to inspect the compressor of the gas turbine engine to determine whether any repair work is required. For example, the engineer may insert a borescope into the gas turbine engine to inspect the compressor blades. The engineer may rotate the intermediate pressure compressor using a rod or a stick to enable viewing of different compressor blades. However, such rotation may be difficult to achieve since the path to the intermediate pressure compressor may be relatively tortuous.

BRIEF SUMMARY

According to various, but not necessarily all, embodiments there is provided apparatus to enable rotation of a compressor, the apparatus comprising: a guide for insertion through a fan of a gas turbine engine to the compressor, the guide including: a surface arranged to guide a drive assembly through an interior portion of the gas turbine engine to the compressor; and a first fastener arranged to fasten the guide to the gas turbine engine.

The guide may be elongate and may include a first end and a second opposite end.

The first end of the guide may define a channel arranged to receive a first member of the drive assembly to at least partially fasten the drive assembly to the guide.

The first fastener may comprise a lever arranged to enable fastening and unfastening of the guide to the gas turbine engine. The lever may be positioned at the second end of the guide.

The guide may define a cavity arranged to receive a vane of the gas turbine engine therein.

The cavity may include a notch to facilitate movement of the guide within the gas turbine engine and into position relative to the compressor.

The guide may comprise a second fastener arranged to fasten the drive assembly to the guide to prevent relative movement between the drive assembly and the guide.

The guide may further comprise at least one bushing for contacting the gas turbine engine during insertion of the guide to the gas turbine engine to prevent the guide from causing damage to the gas turbine engine.

The apparatus may further comprise at least one resilient member mounting the at least one bushing to the guide.

The apparatus may further comprise a drive assembly for insertion into the gas turbine engine to rotate the compressor. The drive assembly may comprise a first member to engage a channel in a first end of the guide.

The drive assembly may further comprise a second member to contact the guide during insertion of the drive member into the gas turbine engine to prevent relative movement between the drive assembly and the guide. The contact between the second member and the guide may be indicative that the drive assembly is to be rotated to align the drive assembly with blades of the compressor.

The guide may define an open aperture though which the drive assembly is insertable, wherein the second member of the drive assembly contacts the guide at the open aperture prior to rotation, and the second member does not contact the guide at the open aperture subsequent to rotation.

According to various, but not necessarily all, embodiments there is provided a method to enable rotation of a compressor, the method comprising: inserting a guide through a fan of a gas turbine engine to the compressor, the guide including: a surface for guiding a drive assembly through an interior portion of the gas turbine engine to the compressor; and operating a first fastener to fasten the guide to the gas turbine engine.

The method may further comprise: inserting a drive assembly into the gas turbine engine using the guide to rotate the compressor and at least partially fastening the drive assembly to the guide by moving a first member of the drive assembly into a channel defined within the guide.

The method may further comprise: rotating the drive assembly subsequent to a second member of the drive assembly contacting the guide at an open aperture of the guide.

The method may further comprise: operating a second fastener to fasten the drive assembly to the guide to prevent relative movement between the drive assembly and the guide.

According to various, but not necessarily all, embodiments there is provided a drive assembly for rotating a compressor of a gas turbine engine, the drive assembly comprising: a drive head including: an engagement mechanism arranged to engage and rotate blades of a compressor; and a first member arranged to engage a channel in a first end of a guide to at least partially fasten the drive assembly to the guide.

The drive assembly may further comprise a second member to contact the guide during insertion of the drive member into the gas turbine engine to prevent relative movement between the drive assembly and the guide, the contact between the second member and the guide being indicative that the drive assembly is to be rotated to align the drive assembly with the blades of the compressor.

The skilled person will appreciate that except where mutually exclusive, a feature described in relation to any one of the above aspects of the invention may be applied mutatis mutandis to any other aspect of the invention.

BRIEF DESCRIPTION

Embodiments of the invention will now be described by way of example only, with reference to the Figures, in which.

DETAILED DESCRIPTION

Figure 1:
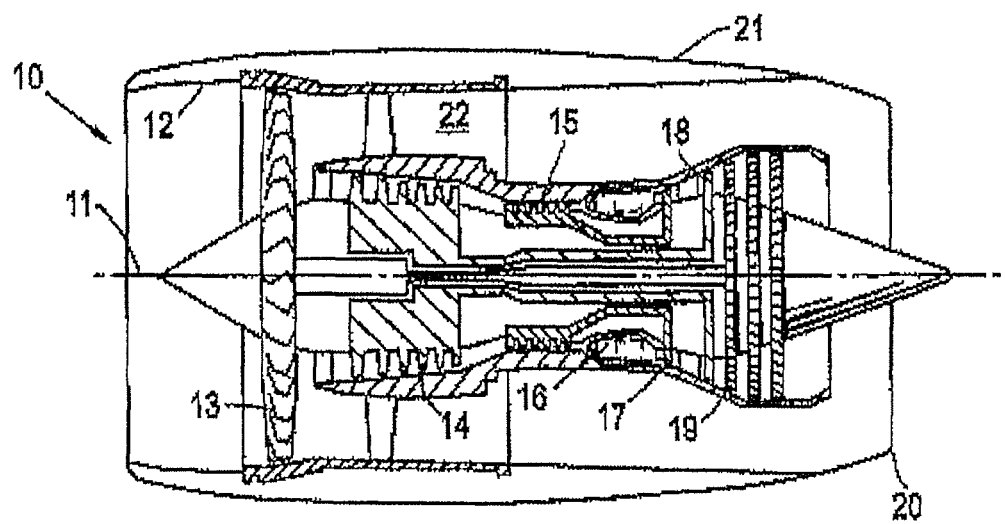
FIG. 1 illustrates a sectional side view of a gas turbine engine.

In more detail, FIG. 1 illustrates a gas turbine engine 10 having a principal and rotational axis 11. The gas turbine engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

In operation, air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
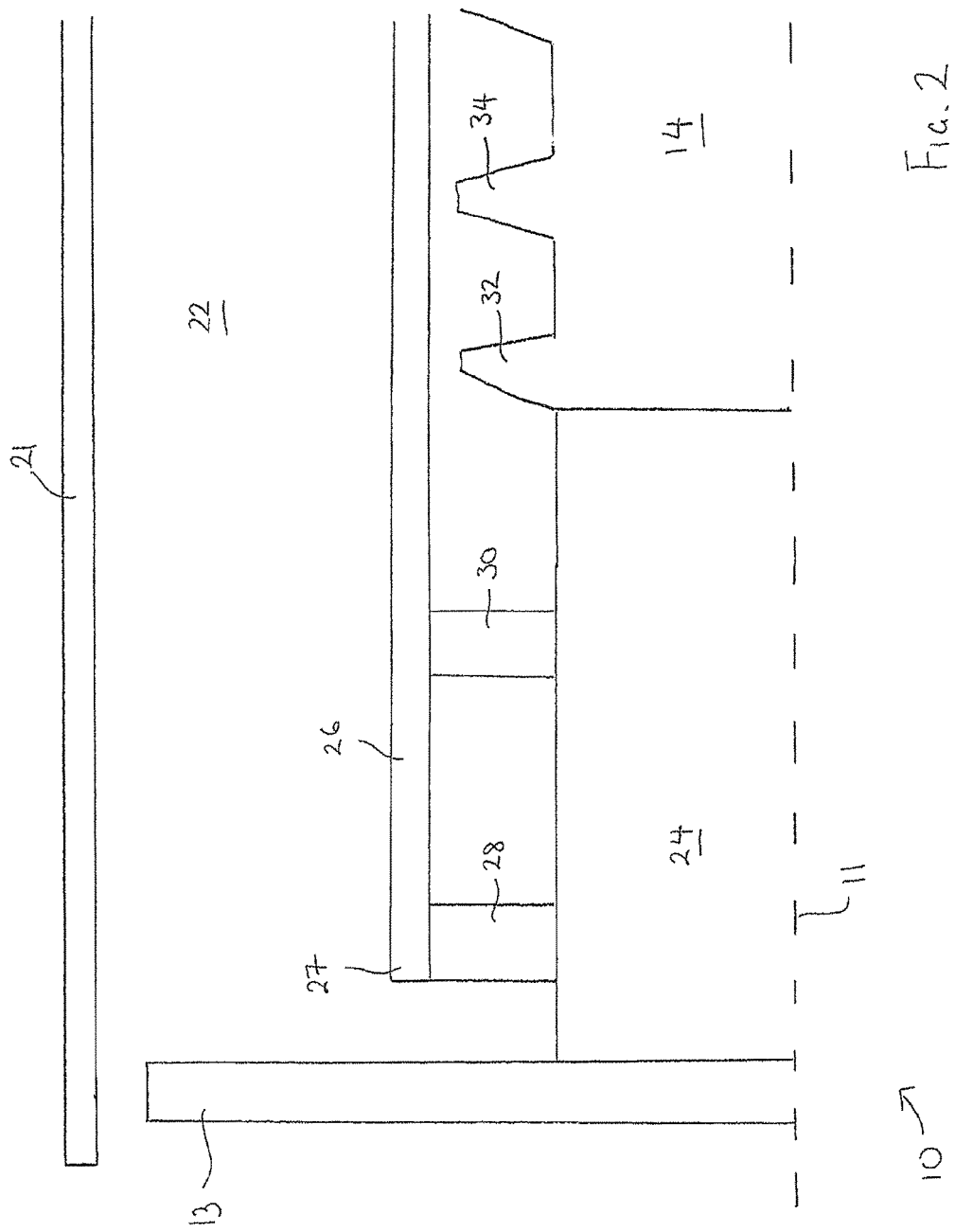
FIG. 2 illustrates a close-up sectional side view of the gas turbine engine illustrated in FIG. 1.

FIG. 2 illustrates a close-up sectional side view of the gas turbine engine 10 illustrated in FIG. 1. The gas turbine engine 10 includes the fan 13, the intermediate pressure compressor 14, the nacelle 21, a core inner annulus 24, a core engine casing 26, engine section stator (ESS) vanes 28, and variable inlet guide vanes 30.

The intermediate pressure compressor 14 includes multiple compressor blade stages that are spaced apart from one another along the principal axis 11 of the gas turbine engine 10. For example, the intermediate pressure compressor 14 includes a first stage of compressor blades 32, a second stage of compressor blades 34, and so on. The first stage of compressor blades 32 is positioned adjacent to the variable inlet guide vanes 30 and between the second stage 34 of the compressor blades and the variable inlet guide vanes 30. In other examples, the intermediate pressure compressor 14 may only include a single stage of compressor blades. The core engine casing 26 includes an engine section stator outer guide vane (ESS-OGV) splitter 27 which is located at the end of the core engine casing 26 adjacent to the fan 13.

The engine section stator vanes 28 are positioned along the principal axis 11 of the gas turbine engine 10 between the fan 13 and the variable inlet guide vanes 30. The engine section stator vanes 28 extend between the core inner annulus 24 and the core engine casing 26. The engine section stator vanes 28 are positioned within the first air flow when the gas turbine engine 10 is in operation and define a plurality of apertures through which the first air flow may flow.

The variable inlet guide vanes 30 are positioned along the principal axis 11 of the gas turbine engine 10 between the engine section stator vanes 28 and the intermediate pressure compressor 14. The variable inlet guide vanes 30 extend between the core inner annulus 24 and the core engine casing 26 and are therefore also positioned within the first air flow when the gas turbine engine 10 is in operation. The variable inlet guide vanes 30 define a plurality of apertures through which the first air flow may flow.

Figure 3:
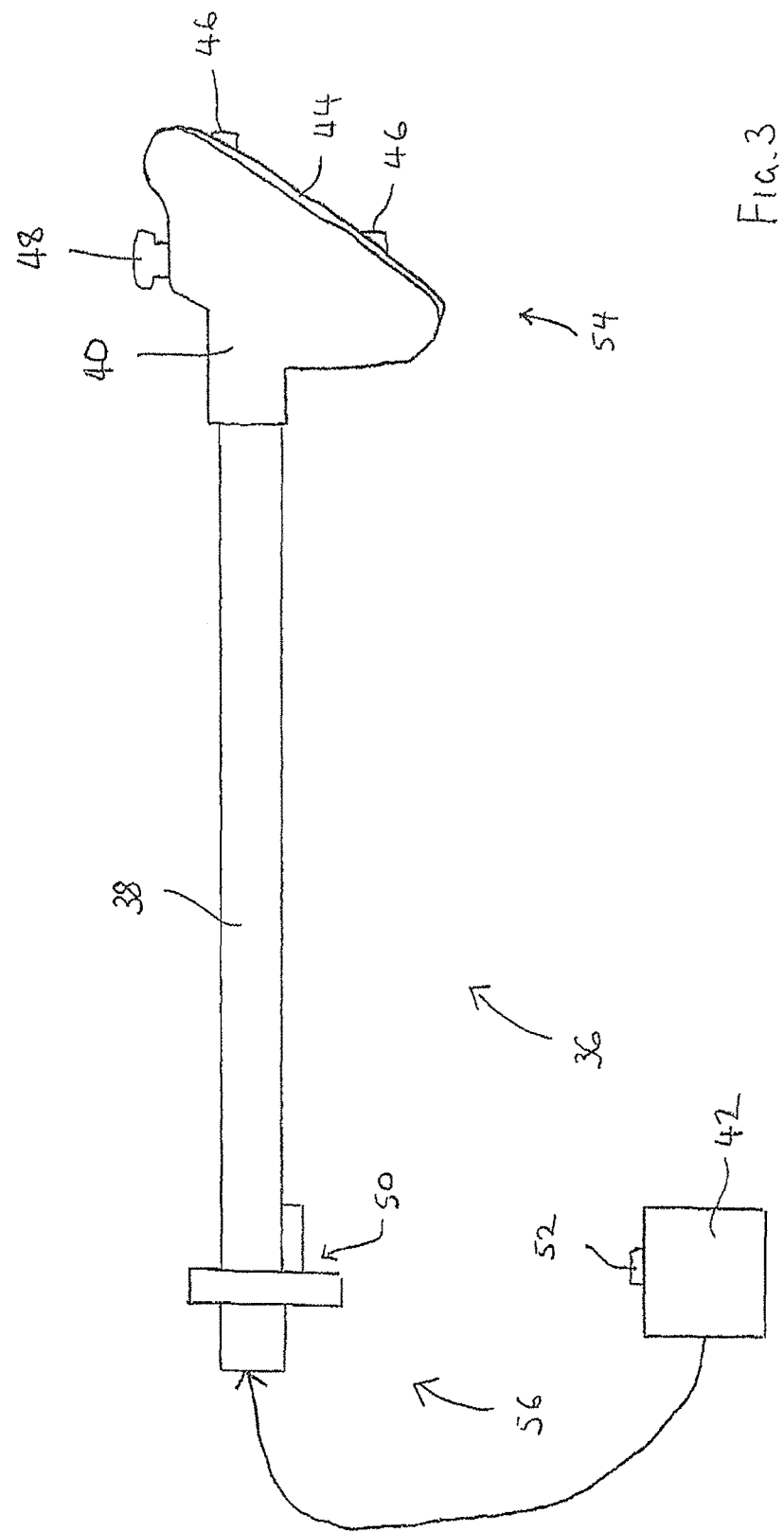
FIG. 3 illustrates a side view of a drive assembly according to various examples.

FIG. 3 illustrates a side view of a drive assembly 36 according to various examples. The drive assembly 36 includes an elongate body 38, a drive head 40, a motor 42, an engagement mechanism 44, 46, a first member 48, a second member 50, and a switch 52. In summary, the drive assembly 36 is arranged to be inserted through the fan 13 of the gas turbine engine 10 to the first stage 32 of the intermediate pressure compressor 14. Once in contact with the first stage 32, an engineer may use the drive assembly 36 to rotate the first stage 32 (and thus the intermediate pressure compressor 14) to enable the intermediate pressure compressor 14 to be inspected.

The elongate body 38 is substantially cylindrical and has a first end 54 and a second opposite end 56. The length of the elongate body 38 between the first end 54 and the second end 56 may be equal to, greater than, or less than the distance between the first stage 32 of the intermediate pressure compressor 14 and the fan 13. The elongate body 38 may comprise a rigid material that enables the drive assembly 36 to be held at the second end 56 with little or no deflection at the first end 54 (that is, the elongate body 38 has little or no curvature when held at the second end 56). Alternatively, the elongate body 38 may comprise a flexible material or one or more joints that enable the elongate body 38 to curve in at least one position between the first end 54 and the second end 56.

The drive head 40 is positioned at the first end 54 of the elongate body 38 and defines a housing for the engagement mechanism 44, 46. The drive head 40 is sized and shaped in at least one dimension to enable the drive head 40 to be inserted through an aperture defined in the engine section stator vane ring 28 and through an aperture defined between the variable inlet guide vanes 30.

The motor 42 is external to, and remote from the elongate body 38 and the drive head 40, and is electrically coupled to the elongate body 38 via a cable. The motor 42 is arranged to drive the engagement mechanism 44, 46. The motor 42 may be powered by an electrical energy source (such as a battery), or may be powered via an external electrical energy source (such as mains electricity). The switch 52 may be positioned at the motor 42 (that is, remote from the elongate body 38 and the drive head 40) or may be positioned remote from the motor 42 (and electrically coupled to the motor via an electrical cable). The switch 52 is configured to control the operation of the motor 42. In more detail, the switch 52 is configured to control the supply of electrical energy to the motor 42 and thereby enable a user to start and stop rotation of the engagement mechanism 44, 46.

The engagement mechanism 44, 46 is arranged to engage and rotate blades of intermediate pressure compressor 14. In more detail, the engagement mechanism comprises a belt 44 forming an endless loop and a plurality of teeth 46 that extend outwardly from the belt 44. The motor 42 is arranged to drive the belt 44 to rotate the belt 44 and the plurality of teeth 46. The plurality of teeth 46 are spaced apart from one another around the belt 44 to enable the plurality of teeth 46 to engage successive ones of compressor blades in the first stage 32 of the intermediate pressure compressor 14.

The first member 48 protrudes from the drive head 40 at the first end 54 of the elongate body 38. The first member 48 has a first portion extending from the drive head 40 and a second portion extending from the first portion. The second portion has a greater width (or diameter) than the first portion and consequently, the first member 48 has a cotton reel or mushroom shape.

The second member 50 protrudes outwardly from the elongate member 38 at the second end 56. As illustrated in FIG. 3, the second member 50 protrudes outwardly from a portion of the perimeter of the elongate body 38 (that is, from an arc where the elongate body 38 is cylindrical) and consequently provides the elongate body 38 with a greater diameter within the portion.

FIGS. 4, 5, 6, 7, 8A & 8B illustrate various views of a guide 58 according to various examples. The guide 58 is elongate and extends along an axis 59 and has a first end 60, a second opposite end 62 and defines a surface 64 extending there between. The guide 58 comprises a support member 66, a first contact member 70, a second contact member 72, a third contact member 73, a plurality of bushings 74, a first fastener 76, and a second fastener 78.

In summary, the guide 58 is arranged to be inserted through the fan 13 of the gas turbine engine 10 and define a path through the engine section stator vanes 28 and variable inlet guide vanes 30 to the first stage of compressor blades 32. The drive assembly 36 may be inserted through the fan 13 of the gas turbine engine 10 and along the path defined by the guide 58 to the first stage of compressor blades 32. Once in position within the gas turbine engine 10, the drive assembly 36 may be used to rotate the first stage of compressor blades 32 to enable an engineer to inspect the intermediate pressure compressor 14.

As illustrated in FIGS. 4 to 8B, the guide 58 comprises a plurality of sheet metal components that may be manufactured by cutting the components from a sheet of metal (such as steel) using a laser. It should be appreciated that in other examples, the guide 58 may comprise other materials and may be manufactured using different techniques. For example, at least some of the components of the guide 58 may alternatively comprise a plastic and be manufactured via a moulding process.

The guide 58 has a curvature that enables the guide 58 to align with, and subsequently enter, an aperture between adjacent variable inlet guide vanes 30, once the guide 58 has been inserted through an aperture between adjacent engine section stator vanes 28.

The surface 64 is arranged to guide the drive assembly 36 through an interior portion of the gas turbine engine 10 to the compressor 14. In more detail, the surface 64 is shaped so that when the guide 58 is in position within the gas turbine engine 10, the drive assembly 36 may be inserted into the gas turbine engine 10 via the fan 13 and moved along the surface 64 to the first stage 32 of the intermediate pressure compressor 14. In the illustrated example, the surface 64 is defined by the edges of four sheets of metal. In other examples, the surface 64 may be defined by a single piece of material that extends across the width of the guide 58.

The surface 64 defines a cavity 80 that is arranged to receive an engine section stator vane 28 therein. In more detail, the cavity 80 may be shaped to correspond to the cross sectional shape of an engine section stator vane 28 so that the engine section stator vane 28 may fit snugly within the cavity 80 and provide a smooth continuation of the surface 64 along which the drive assembly 36 may be moved.

Figure 4:
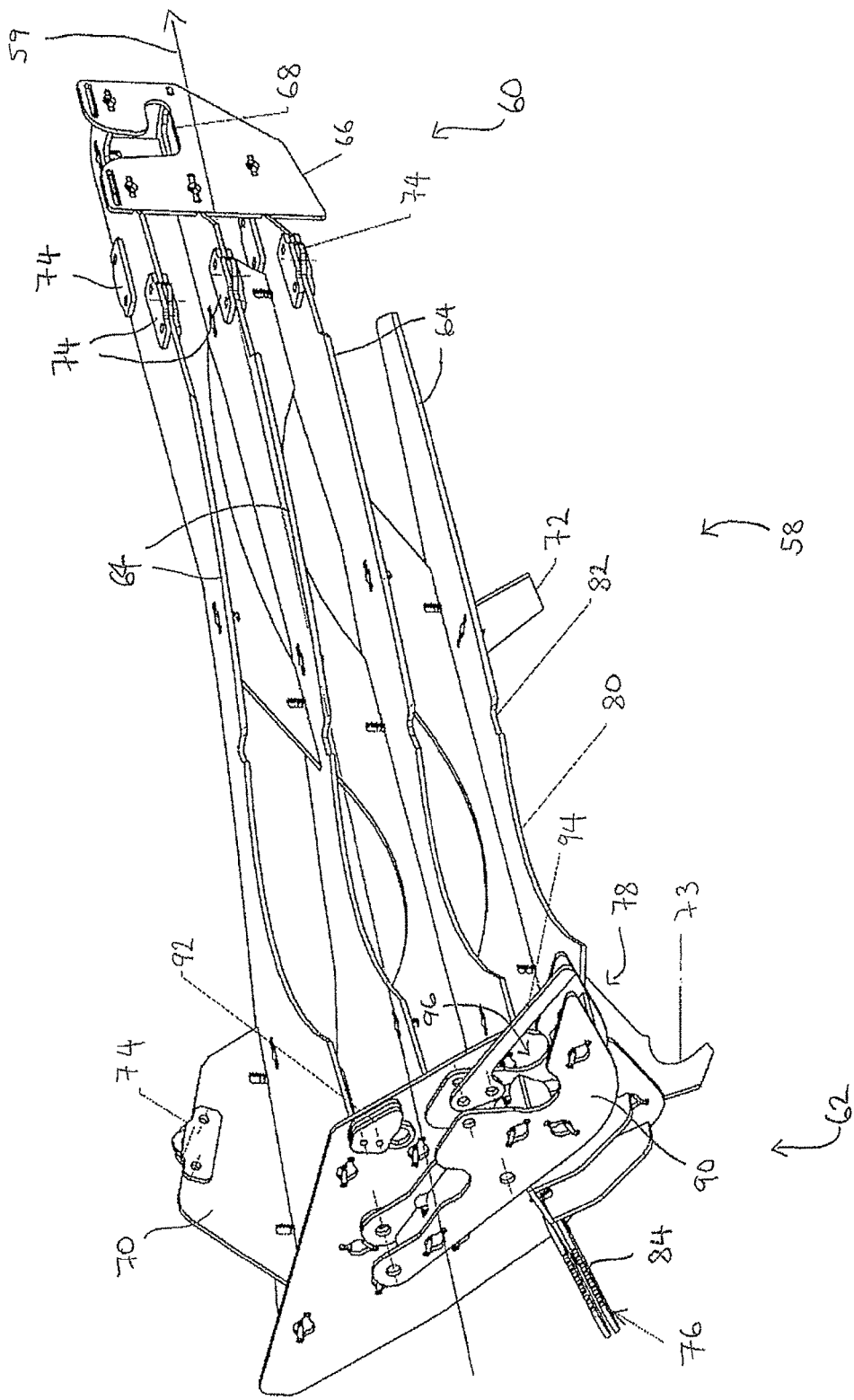
FIG. 4 illustrates a first perspective view of a guide according to various examples.
Figure 5:
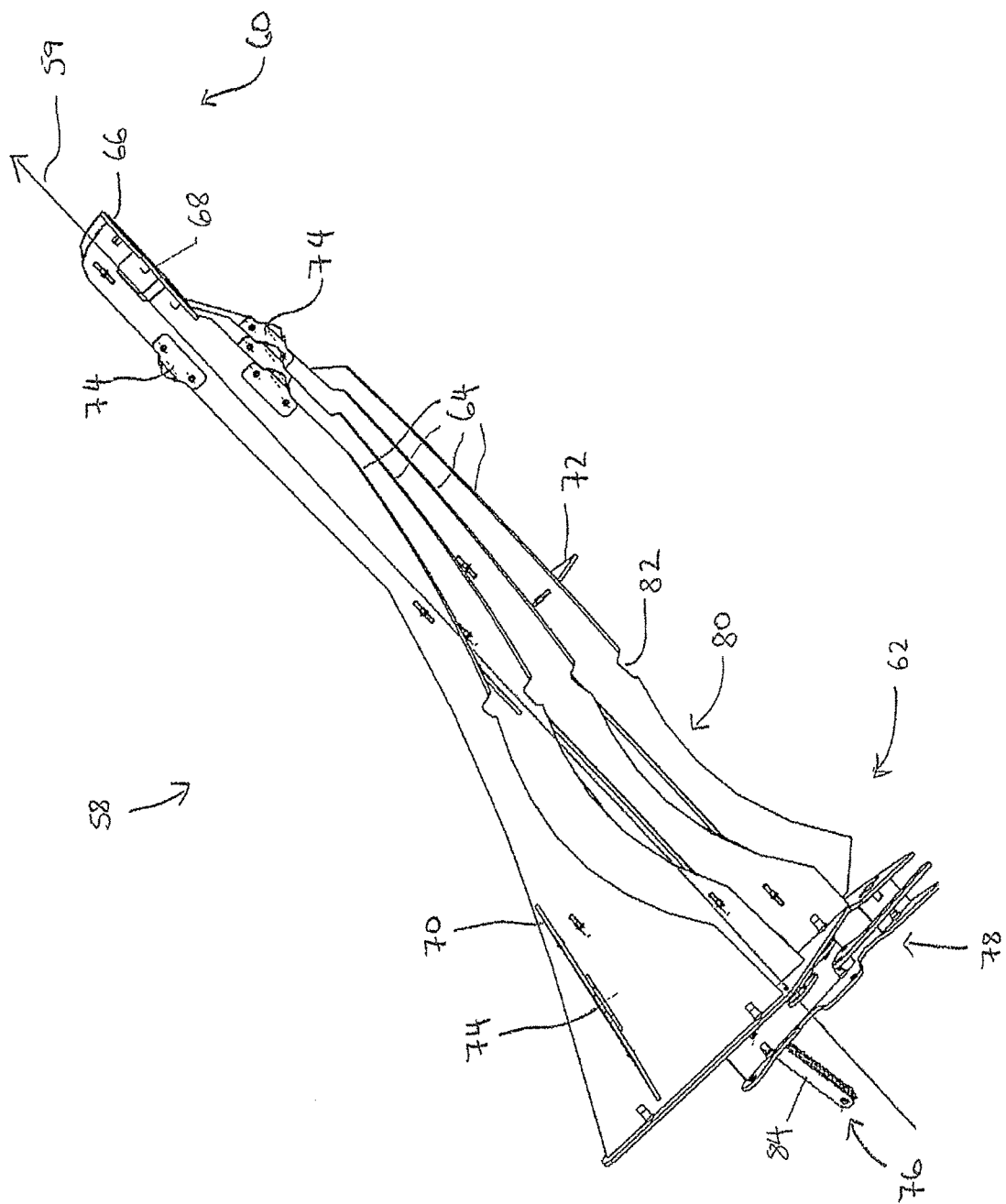
FIG. 5 illustrates a side view of the guide illustrated in FIG. 3.
Figure 6:
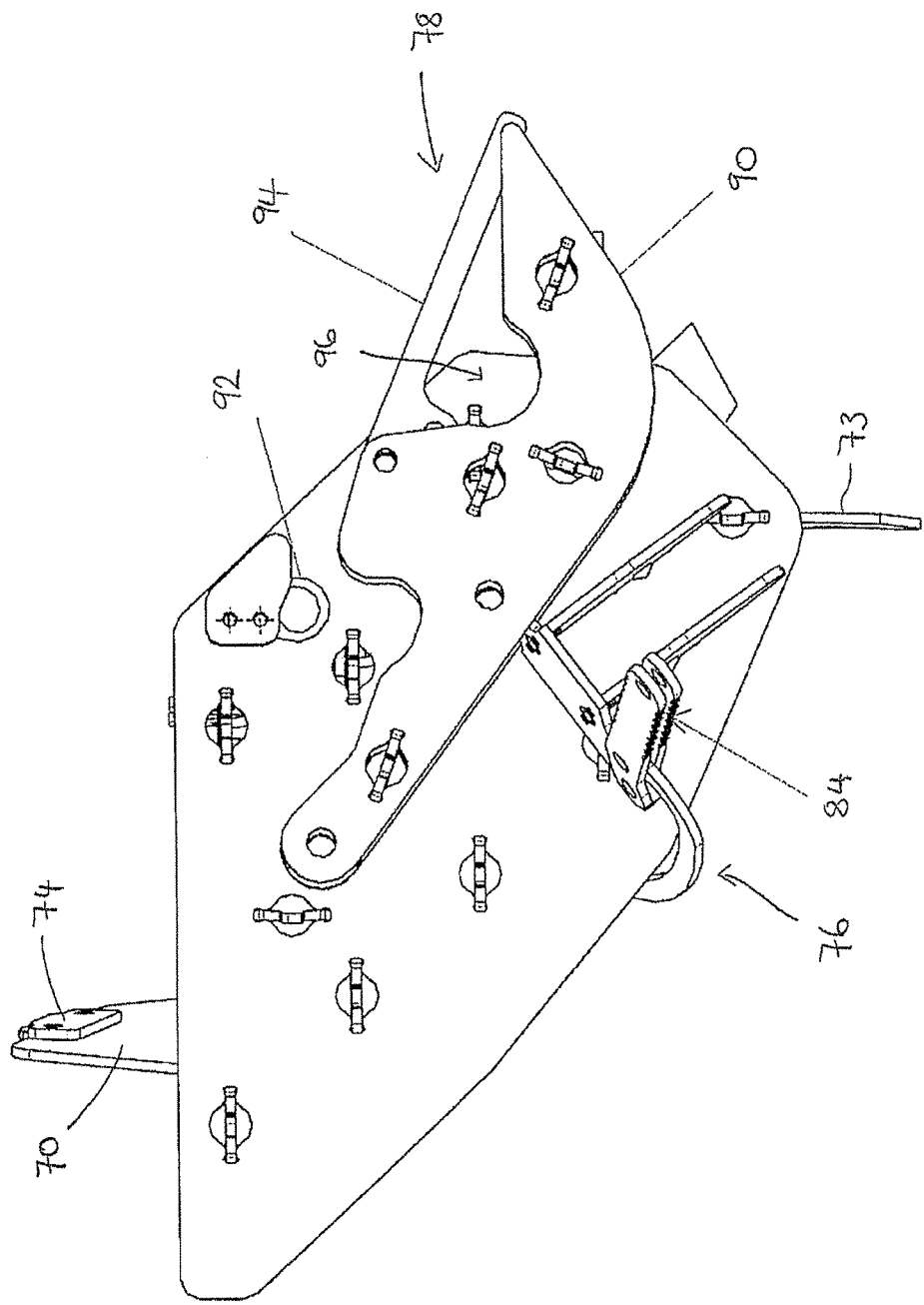
FIG. 6 illustrates a rear view of the guide illustrated in FIGS. 3 and 4.
Figure 7:
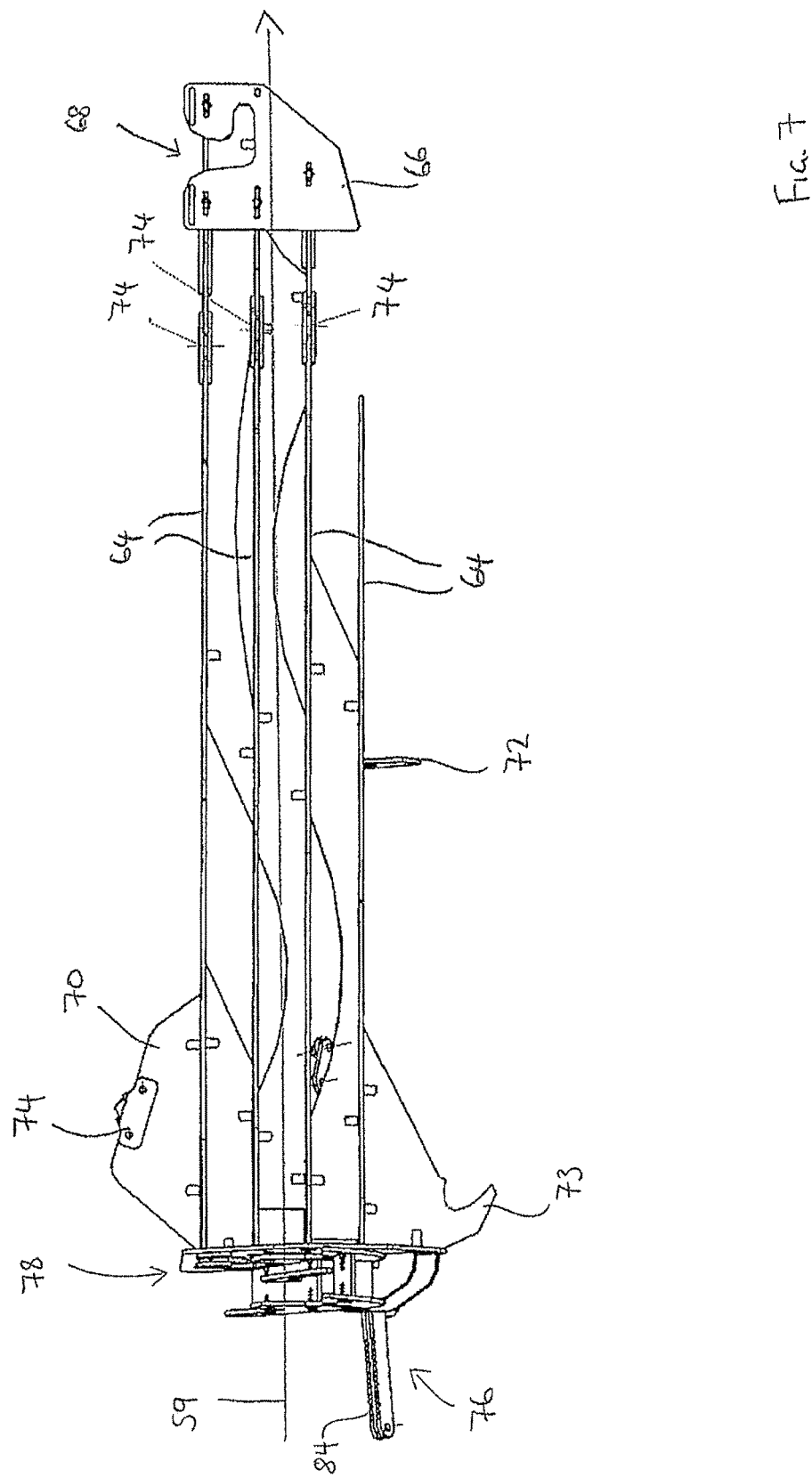
FIG. 7 illustrates a plan view of the guide illustrated in FIGS. 3, 4 and 5.
Figure 8:
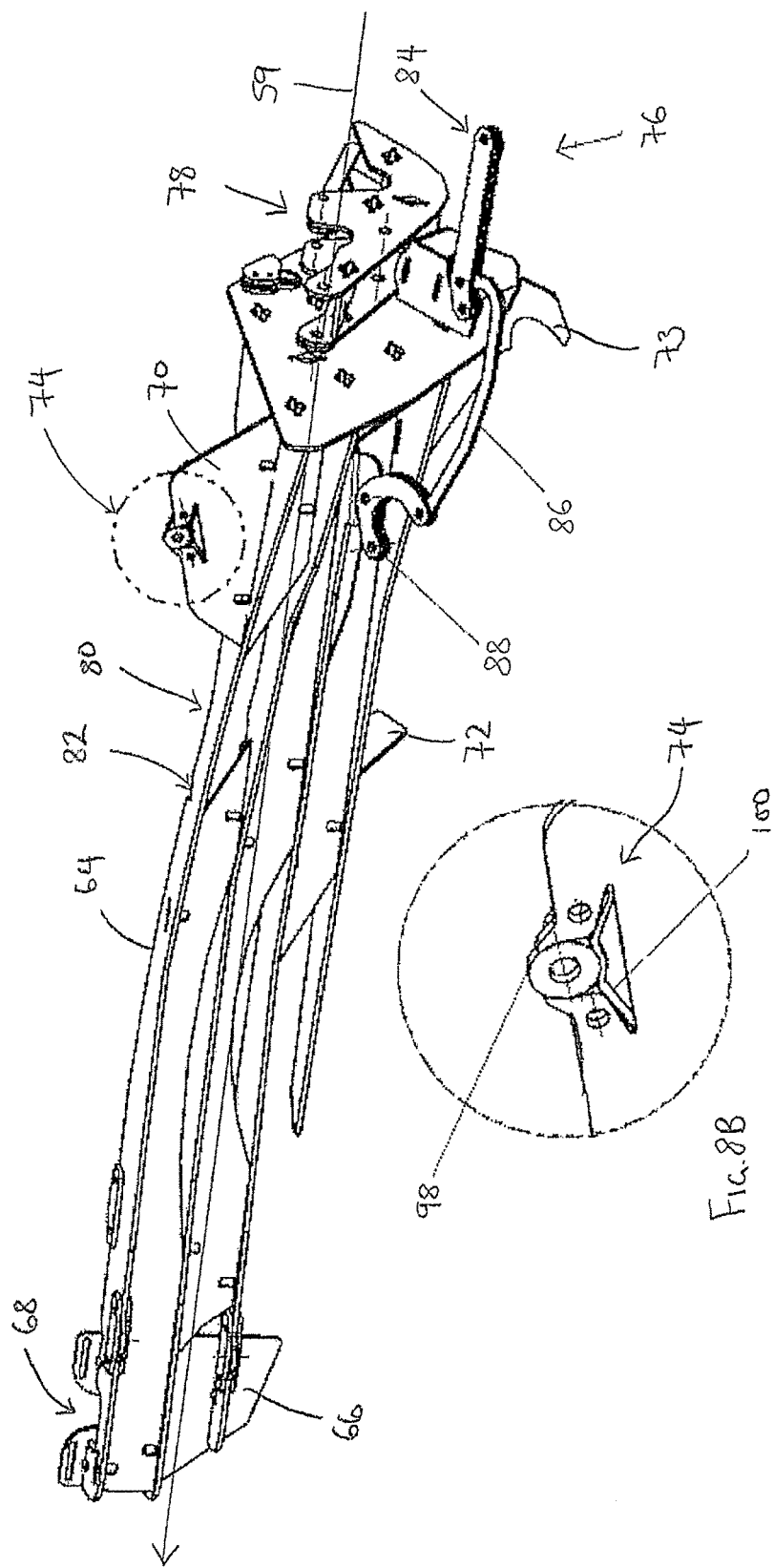
FIG. 8A illustrates a second perspective view of the guide illustrated in FIGS. 4, 5, 6, and 7.
FIG. 8B illustrates a close-up perspective view of the guide illustrated in FIG. 8A.

The cavity 80 includes a notch 82 to facilitate movement of the guide 58 within the gas turbine engine 10 and into position relative to the compressor 14. The notch 82 provides a short continuation of the cavity 80 that is arranged to extend beyond the engine section stator trailing edge, prior to the remainder of the surface 64 (on the right hand side of the notch 82 as illustrated in FIG. 4).

The notch 82 allows the surface 64 to slide (and rotate anticlockwise about the principal axis 11 of the gas turbine engine 10) into position so that the surface 64 forms a 'smooth' guide between the engine section stator vane 28 trailing edge and the variable inlet guide vane 30 leading edge. The notch 82 allows the surface 64 along the cavity 80 to contact the engine section stator vane 28 located anticlockwise of the guide 58 along the full length of the cavity 80.

The support member 66 defines a channel 68 arranged to receive the first member 48 of the drive assembly 36 to at least partially fasten the drive assembly 36 to the guide 58. In this example, the channel 68 has an L shape and the top of the channel 68 (as illustrated in FIG. 4) is open to receive the first member 48. The width of the channel 68 is greater than the first portion of the first member 48, but less than the width of the second portion of the first member 48. Consequently, the first portion of the first member 48 is slidable within the channel 68 and the first member 48 is prevented from being pulled out of the channel 68 by the second portion of the first member 48.

The first contact member 70 extends from the second end 62 of the guide 58 in an outward direction relative to the axis 59. The first contact member 70 is arranged to contact the core inner annulus 24 when the guide 58 is inserted into the gas turbine engine 10 and thereby trap the guide 58 radially relative to the axis 11 of the gas turbine engine 10. The first contact member 70 includes a bushing 74 (which is described in greater in the following paragraphs) to prevent damage being caused by the first contact member 70 to the core inner annulus 24.

The second and third contact members 72, 73 are arranged to contact the core engine casing 26 when the guide 58 is inserted into the gas turbine engine 10. The second contact member 72 extends from the guide 58 and outwardly relative to the axis 59 and is positioned approximately mid-way between the first end 60 and the second end 62. In some examples, the second contact member 72 may comprise a bushing 74 (similar to the first contact member 72). The third contact member 73 also extends from the guide 58 and outwardly relative to the axis 59 and is positioned at the second end 62 of the guide 58.

The first fastener 76 is arranged to fasten the guide 58 to the gas turbine engine 10. As illustrated in FIG. 8A, the first fastener 76 comprises a lever 84, a connector 86, and a first lock 88. The lever 84 is connected to the connector 86 and is pivotally connected to the guide 58. The first lock 88 is also connected to the connector 86 (and hence to the lever 84) and pivotally connected to the guide 58. An engineer may rotate the lever 84 to move the first lock 88 to engage an engine section stator vane 28 to fasten the guide 58 to the gas turbine engine 10.

The second fastener 78 is arranged to fasten the drive assembly 36 to the guide 58 to prevent relative movement between the drive assembly 36 and the guide 58. The second fastener 78 includes a cradle 90, a detent 92 and a second lock 94.

The cradle 90 is pivotable relative to the guide 58 and may be locked in place by the detent 92 to support the drive assembly 36. The cradle 90 defines an open aperture 96 for receiving the elongate body 38 of the drive assembly 36 therein. The second lock 94 is pivotable relative to the cradle 90 to fasten the elongate body 38 of the drive assembly 36 within the open aperture 96 of the cradle 90.

The bushings 74 are arranged to contact the gas turbine engine 10 during insertion of the guide 58 to the gas turbine engine 10 to prevent the guide 58 from causing damage to the gas turbine engine 10 during insertion of the guide 58. Bushings 74 are located on the surface 64, on the edges of the guide 58 opposite to the surface 64, and on the first contact member 70.

The structure of a bushing 74 is illustrated in FIG. 8B according to an example. The bushing 74 includes an element 98 for contacting the gas turbine engine 10 during insertion of the guide 58, and at least one resilient member 100 mounting the at least one bushing 74 to the guide 58. The element 98 comprises a different material to the remainder of the guide 58 that is selected to minimize or eliminate damage to the gas turbine engine 10 when the guide 58 is inserted into the gas turbine engine 10. For example, the element 98 may comprise a nylon washer.

The resilient member 100 includes an M shaped spring that may be manufactured via laser cutting of sheet metal. In other examples, the at least one resilient member 100 may comprise one or more helical springs or one or more resilient materials (such as rubber). In further examples, the at least one resilient member 100 may be integrated with the element 98 so that the element 98 comprises a resilient material (such as rubber).

Figure 9:
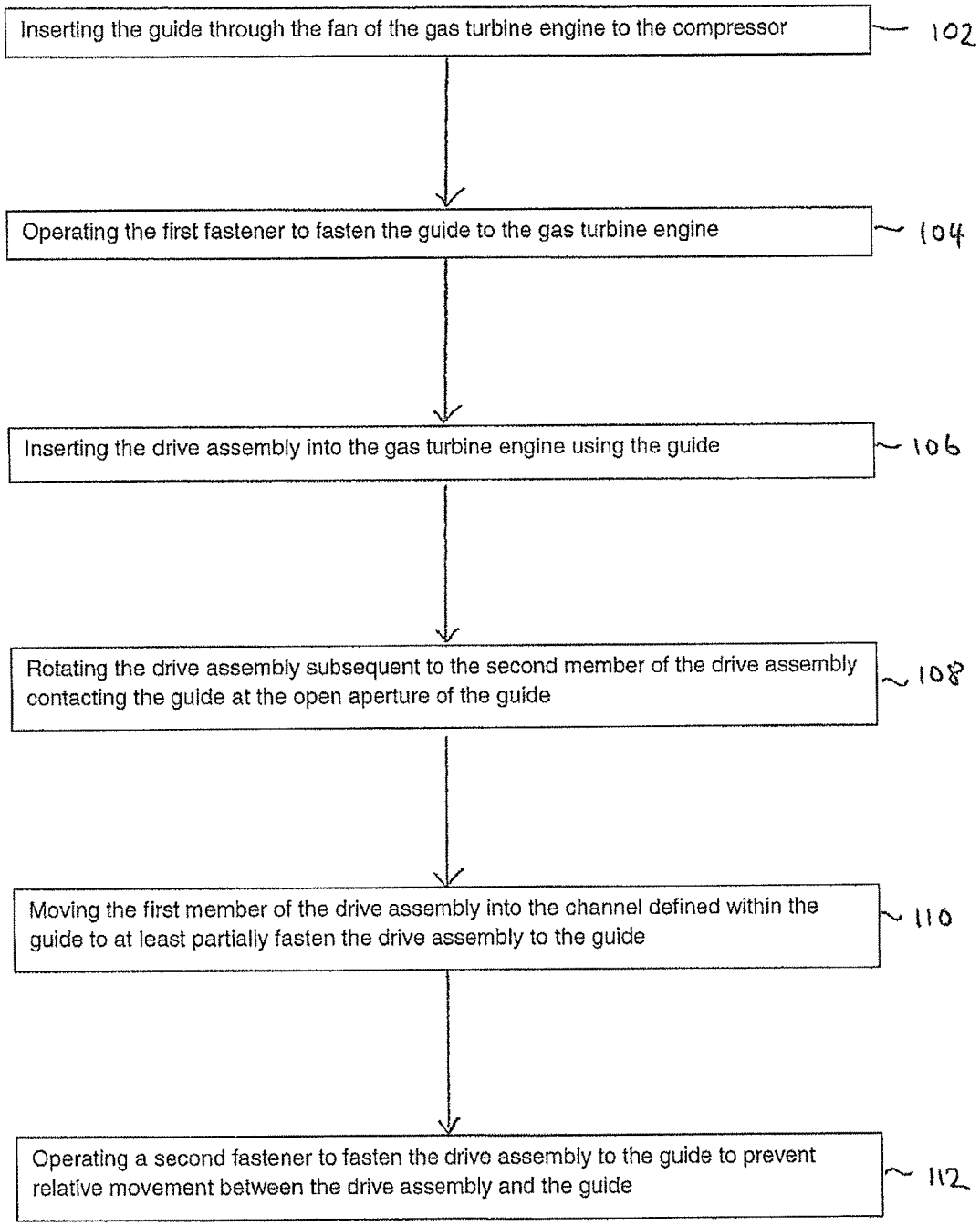
FIG. 9 illustrates a flow diagram of a method to enable rotation of a compressor according to various examples.

The operation of the guide 58 and the drive assembly 36 according to an example is described in the following paragraphs with reference to FIG. 9.

At block 102, the method includes inserting the guide 58 through the fan 13 of the gas turbine engine 10 to the intermediate pressure compressor 14. For example, the guide 58 is manipulated by an engineer past the fan blades 13 and the first end 60 of the guide 58 is offered up to an aperture between engine section stator vanes 28. Light pressure is then applied by the engineer to the second end 62 of the guide 58 which then begins to slide into the aperture between the engine section stator vanes 28. The first end 60 of the guide 58 then emerges beyond the engine section stator vane 28 trailing edges, travels in the space between the engine section stator vanes 28 and the variable inlet guide vanes 30, enters an aperture between variable inlet guide vanes 30, and then emerges beyond the variable inlet guide vanes 30 trailing edges. The third contact member 73 located at the second end 62 of the guide 58 then arrests insertion of the guide 58 at a desired depth by contacting the engine section stator outer guide vane splitter 27, shortly before the first end 60 of the guide 58 contacts the leading edge of the first stage 32 of the intermediate pressure compressor 14.

During the above mentioned insertion of the guide 58 into the gas turbine engine 10, the guide 58 rotates about the longitudinal axis 59 to find its way through the varying angle and curvature of the engine section stator vane 28 apertures and the variable inlet guide vane 30 apertures. As mentioned in the preceding paragraphs, the shape of the guide 58 enables the guide 58 to find the correct variable inlet guide vane 30 aperture, despite being used blind by the engineer (since the engineer may not be able to view the first end 60 of the guide 58).

In other words, the geometry of the guide 58 prevents the guide 58 from entering the 'wrong' variable inlet guide vane 30 aperture, or from hitting a variable inlet guide vane 30 leading edge rather than an aperture between two variable inlet guide vanes 30. Consequently, the movement of the guide 58 within the gas turbine engine 10 is influenced by: gravity; the first, second and third contact members 70, 72, 73; and the geometry of the guide 58. An operator may require little to no skill in inserting the guide 58 into the gas turbine engine 10.

At block 104, the method includes operating the first fastener 76 to fasten the guide 58 to the gas turbine engine 10. For example, once the guide 58 has been inserted into the gas turbine engine 10, the engineer may operate the lever 84 to rotate the first lock 88 so to pull the surface 64 at the cavity 80 against an adjacent engine section stator vane 28 and lock the guide 58 in position within the gas turbine engine 10.

In more detail, as the lever 84 is moved towards the 'guide locked' position, the first lock 88 pivots about the axis through which it is fastened to the guide 58, moving its contact tip (visible as the lowest point of first lock 88 as illustrated in FIG. 8A) outward and away from the guide 58, and therefore towards the adjacent engine section stator vane 28 (clockwise as viewed through the fan 13 of the gas turbine engine 10). On contact of the engine section stator vane 28 with the first lock 88, the surface 64 at the cavity 80 is pushed towards and against the engine section stator vane 28 anticlockwise of the guide 58. The geometry of first lock 88 is designed such that at the point the first lock 88 contacts the engine section stator vane 28 surface, it is pushing approximately normal to a tangent of the surface 64 at the cavity 80. That is, the first lock 88 is arranged to push the surface 64 at the cavity 80 directly against the curved surface of the engine section stator vane 28.

At block 106, the method includes inserting the drive assembly 36 into the gas turbine engine 10 using the guide 58. For example, the drive assembly 36 may be manipulated past the fan 13 in same way as the guide 58, and offered into an engine section stator vane 28 aperture which is adjacent and next to the aperture occupied by the guide 58 (in the anti-clockwise direction for example). Once the drive head 40 passes the engine section stator vanes 28 leading edges, the cradle 90 may be rotated up and locked in place using the detent 92, to cradle the elongate body 38 of the drive assembly 36 and thereby control the position of the drive assembly 36 during the remainder of insertion into the gas turbine engine 10.

The drive assembly 36 may then be inserted through the engine section stator vane stage 28 and the variable inlet guide vane stage 30. The guide 58 occupies the gap between the engine section stator vane stage 28 and the variable inlet guide vane stage 30 and provides a surface 64 having a smooth, continuous profile in the direction of insertion of the drive assembly 36. The drive head 40 may advantageously follow the surface 64 without interruption, catching or sticking. In this example, the guide 58 may be inserted so that gravity allows the drive head 40 to follow the guide 58 between engine section stator vanes 28 and the variable inlet guide vanes 30 without either missing the required aperture (which could then result in the drive head 40 partially entering the wrong variable inlet guide vane 30 aperture and becoming stuck) or rotating prior to variable inlet guide vane 30 entry (which may result in similar jamming and inability to remove without a borescope for assistance). In such examples, the guide 58 may be inserted at a five o'clock position (when looking through the fan 13 of the gas turbine engine 10).

At block 108, the method includes rotating the drive assembly subsequent to the second member 50 of the drive assembly 36 contacting the guide 58 at the open aperture 96 of the guide 58. For example, once the drive head 40 passes the variable inlet guide vane 30 trailing edges and enters the space between variable inlet guide vanes 30 and the first stage 32 of the intermediate pressure compressor 14, the second member 50 on the drive assembly 36 contacts the cradle 90 and prevents further insertion of the drive assembly 36. Subsequently, the drive assembly 36 may be rotated by the engineer (approximately 100 degrees anti-clockwise for example) in order to allow the drive head 40 to align with the compressor blades of the first stage 32 of the intermediate pressure compressor 14.

At block 110, the method includes moving the first member 48 of the drive assembly 36 into the channel 68 defined within the guide 58 to at least partially fasten the drive assembly 36 to the guide 58. For example, during the rotation in block 108, the first member 48 of the drive assembly 36 enters the opening of the 'L' shaped channel 68 defined in the support member 66. The operator continues rotation until the first member 48 is felt by the engineer to contact the wall of the channel 68, at which stage, the drive head 40 is positioned correctly relative to the guide 58 in terms of rotation.

The drive assembly 36 and the guide 58 are arranged so that above described rotation occurs beyond the insertion depth at which the drive head 40 passes the variable inlet guide vanes 30, but prior to the belt 44 contacting the first stage 32 of the intermediate pressure compressor 14. Furthermore, the insertion depth at which rotation occurs is selected to allow the first member 48 to enter the channel 68 without jamming, binding or catching, while the engineer is working blind (that is, where the engineer cannot view the first end 60 of the guide 58 or the drive head 40). The second member 50 on the drive assembly 36 is positioned to enable the user to rotate the drive assembly 36 at the correct insertion depth during insertion of the drive assembly 36 into the gas turbine engine 10.

Where the first member 48 has a 'cotton reel' shape, the first member 48 enables relatively easy entry of the first member 48 into the channel 68. While the elongate body 38 is being rotated about its longitudinal axis, the first member 48 may be moved into channel 68 while the engineer is working 'blind' and without jamming within the gas turbine engine 10, despite the varying side-to-side position of the drive head 40 at the point of rotation (restricted only by the variable inlet guide vanes 30 to its left and right).

Once the operator has completed rotation of the drive assembly 36, the second member 50 becomes aligned with the opening of the open aperture 96 and consequently, the second member 50 no longer prevents insertion of the drive assembly 36, and the engineer may then continue insertion of the drive assembly 36 until the belt 44 is felt to contact the leading edges of the first stage 32 of the intermediate pressure compressor 14.

At block 112, the method includes operating the second fastener 78 to fasten the drive assembly 36 to the guide 58 to prevent relative movement between the drive assembly 36 and the guide 58. For example, the second lock 94 may be rotated by the engineer to lock the elongate body 38 to the guide 58, both in terms of rotation and insertion depth.

The guide 58 and drive assembly 36 may provide several advantages. First, the guide 58 may be relatively simple to insert within the gas turbine engine 10. The guide 58 is advantageously sized and shaped so that once the guide 58 has been manoeuvred through an aperture between adjacent engine section stator vanes 28, the guide 58 is aligned with an aperture between adjacent variable inlet guide vanes 30.

Second, the drive assembly 36 may be relatively simple to insert within the gas turbine engine 10 by using the guide 58. In more detail, the guide 58 presents a relatively smooth profile along which the drive assembly 36 may be moved within the gas turbine engine 10.

Third, the guide 58 may enable consistent positioning of the drive assembly 36 within the gas turbine engine 10 because the first fastener 76 enables the guide 58 to be fastened to the gas turbine engine 10.

Fourth, the notch 82 may be advantageous in that the notch 82 may enable the location at which the third contact member 73 contacts the engine section stator outside guide vane (ESS-OGV) splitter to correspond with the surface 64 (between the notch 82 and the first end 60) being inserted fully past the engine section stator trailing edge, and the guide 58 may then seat against the relevant engine section stator vane 28.

Fifth, when the drive assembly 36 is fastened to the guide 58 via the second fastener 78, the drive assembly 36 may provide consistent rotation of the intermediate pressure compressor 14 (that is, the teeth 46 may engage successive compressor blades and consequently, the drive assembly may cause little to no angular speed variation when rotating the intermediate pressure compressor 14).

Sixth, the guide 58 may enable relatively accurate radial positioning of the drive head 40 within the gas turbine engine 10. This may be advantageous because the belt 44 of the drive assembly 46 may include large discrete teeth 46 that are spaced to match the pitch between adjacent compressor blades 32. However, since the compressor blades 32 radiate outwards from a compressor hub, the spacing between compressor blades 32 increases as the drive head 40 is moved further radially from the engine centreline, and the spacing between the teeth 46 may only 'match' the compressor blade 32 spacing at one radial location. If continuous rotation of the intermediate pressure compressor 14 is desired, it is advantageous to position the drive head 40 radially to a high degree of accuracy.

Seventh, the one or more bushings 74 may enable the guide 58 to be inserted into the gas turbine engine 10 without causing damage to the gas turbine engine 10.

It will be understood that the invention is not limited to the embodiments above-described and various modifications and improvements can be made without departing from the concepts described herein. For example, the apparatus may be used to turn a compressor of a two stage gas turbine engine, or may be used to turn a compressor of a gas turbine engine having more than three stages. By way of a further example, two guides 58 may be used to guide a drive assembly 36 within the gas turbine engine 10. In such examples, the guides 58 may not include the channel 68 and the drive assembly 36 may not include the first member 48. In some examples, the surface 64 may not define a notch 82.

Figure 10:
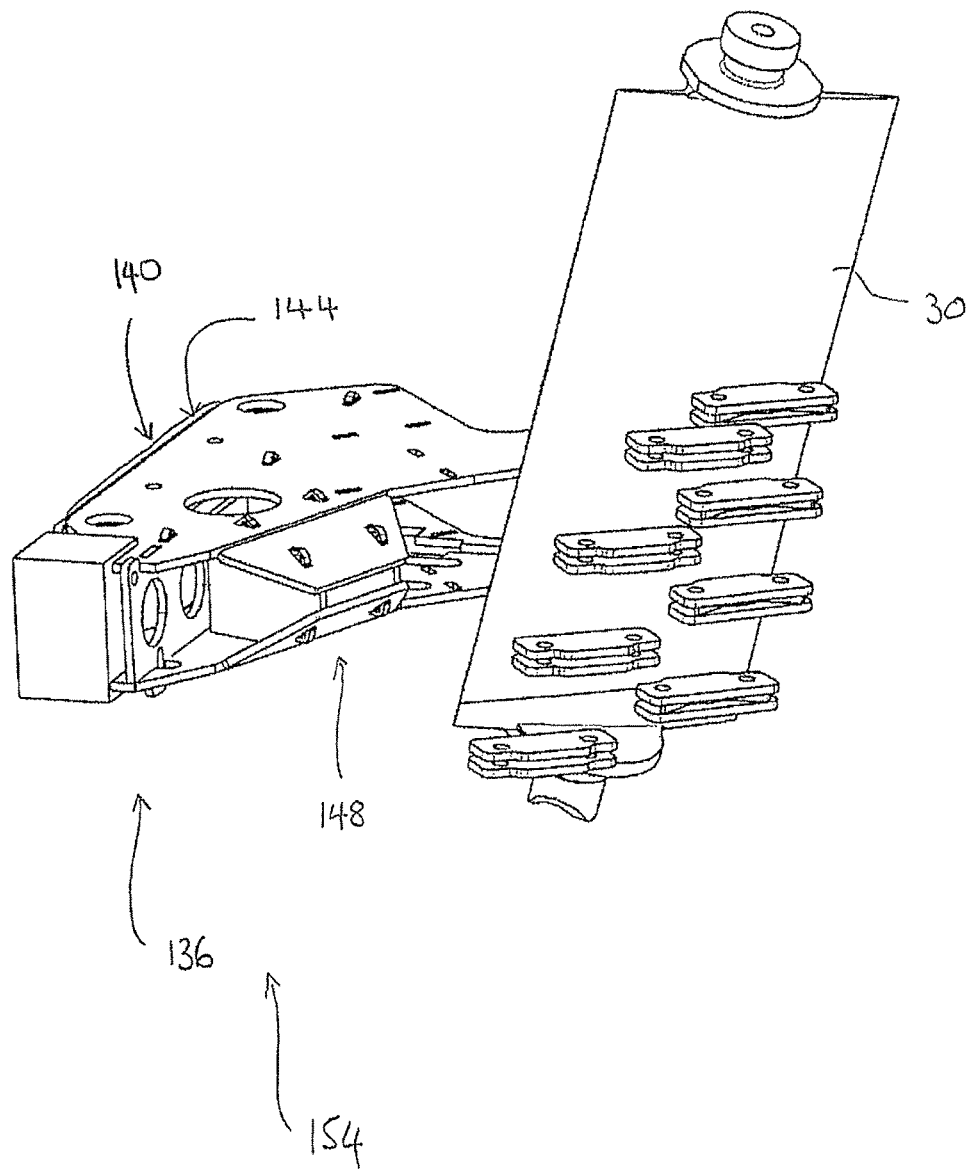
FIG. 10 illustrates a perspective view of another drive assembly according to various examples.

FIG. 10 illustrates a perspective view of another drive assembly 136 according to various examples, and a variable inlet guide vane 30. The drive assembly 136 differs from the drive assembly 36 in that the drive assembly 136 includes a first member 148 (at the first end 154) having a V shaped profile protruding from the rear of the drive head 140. The V shaped profile of the first member 148 converges as the first member 148 protrudes from the drive head 140. The longitudinal axis of the V shaped profile is oriented at an angle relative to the belt 144, rather than being parallel to the belt 144.

Figure 11:
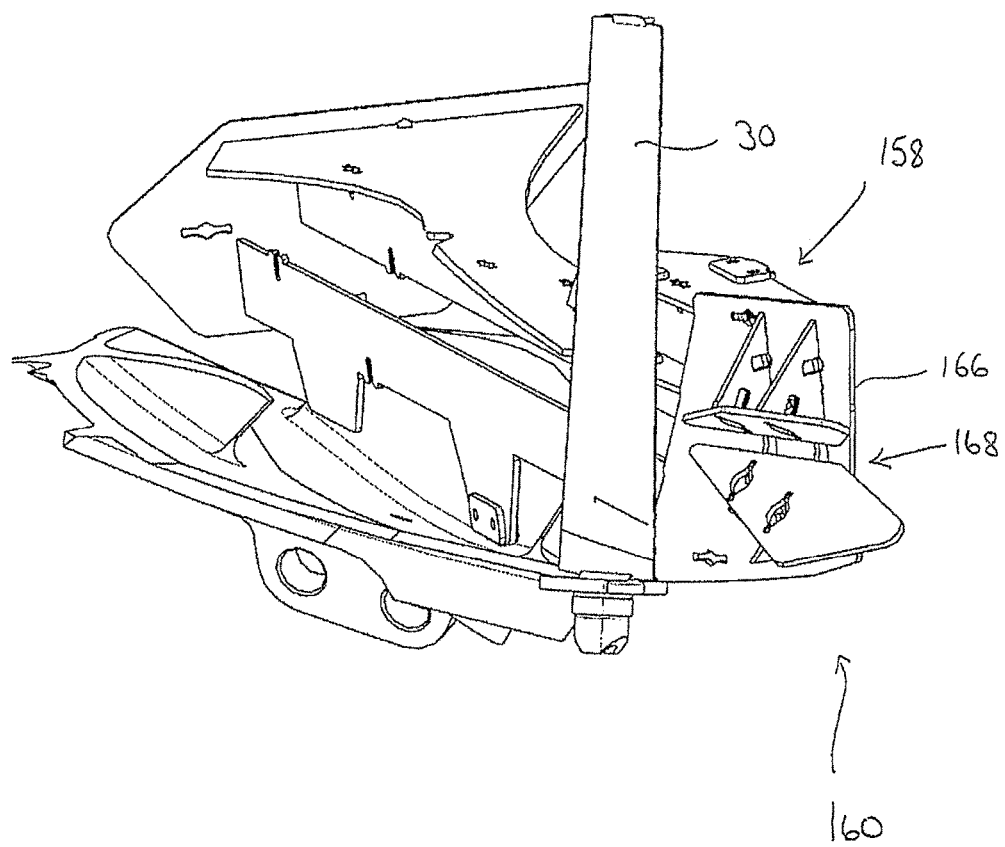
FIG. 11 illustrates a perspective view of another guide according to various examples.

FIG. 11 illustrates a perspective view of another guide 158 according to various examples, and the variable inlet guide vane 30 illustrated in FIG. 10. The guide 158 differs from the guide 58 in that the guide 158 includes a support member 166 at the first end 160 that defines a V shaped channel 168. The V shape of the support member 166 diverges as the support member 166 protrudes from the guide 158 so that the surface area of the channel 168 increases with distance from the guide 158.

In operation, the guide 158 is partially inserted, to a location where the tip of its inner end (at the first end 160) is approximately aligned with the variable inlet guide vane 30 trailing edges. The drive head 140 is then inserted past the variable inlet guide vane 30 trailing edges and rotated. The insertion depth is selected to be a location where the teeth of the drive head 140 teeth meet the first stage 32 of the intermediate pressure compressor 14.

Figure 12:
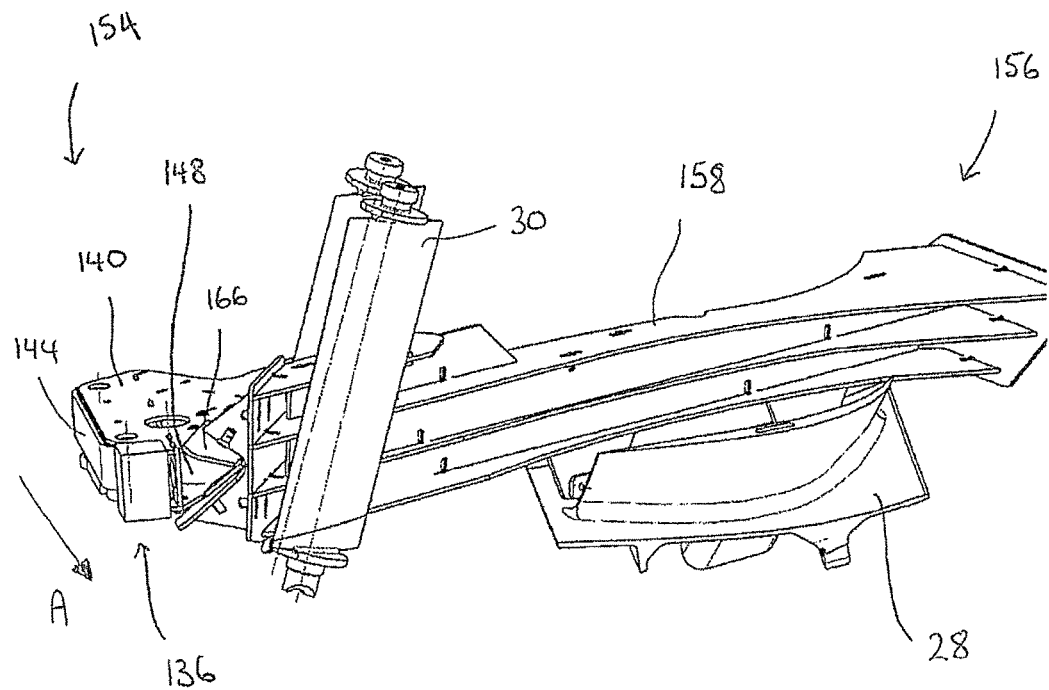
FIG. 12 illustrates a perspective view of the drive assembly illustrated in FIG. 10 and the guide illustrated in FIG. 11.

The guide 158 is then pushed fully into position within the gas turbine engine 10 and locked in position as described above in relation to the guide 58. While the guide 158 is being pushed into the final position within the gas turbine engine 10, the support member 166 engages the first member 148 so that the V shaped profile of the first member 148 slides into the V shaped channel 168 of the support member 166 (as illustrated in FIG. 12)

The remaining degree of freedom at this stage is the angular position of the drive head 140 within the gas turbine engine 10. When rotation of the belt 144 is turned on, the force of the teeth pulling against the compressor blades pulls the drive head 140 in direction A (as illustrated in FIG. 12), thereby pulling the drive head 140 deeper into the wedge formed by the V shaped channel 168 of the support member 166. This motion may position the drive head 140 firmly and accurately relative to the guide 158, and may have the added benefit of keeping the belt 144 of the drive head 140 pushed tightly against the compressor blades, maintaining pressure regardless of any small movement of the guide 158.

In some examples, a second guide 158 may be used on the opposite side of the drive assembly 136, which with suitable geometrical features on its inner end might facilitate initial positioning of the drive head 140 after rotation (for example, make it easier for the first guide to pick the drive head up). There may then be a longer sequence for use of the drive assembly 136, that is: insert the first guide 158 to a certain location; insert and rotate drive assembly 136; insert the second guide 158 fully; insert the first guide 158 fully.

In further examples, the drive assembly 36, 136 may not comprise the cradle 90 and detent 92 and may instead comprise contact members that protrude radially from the elongate body 38, 138 at the end 56, 156. The contact members may enable the end 56, 156 to be 'automatically' guided into the predetermined end position.

Figure 13:
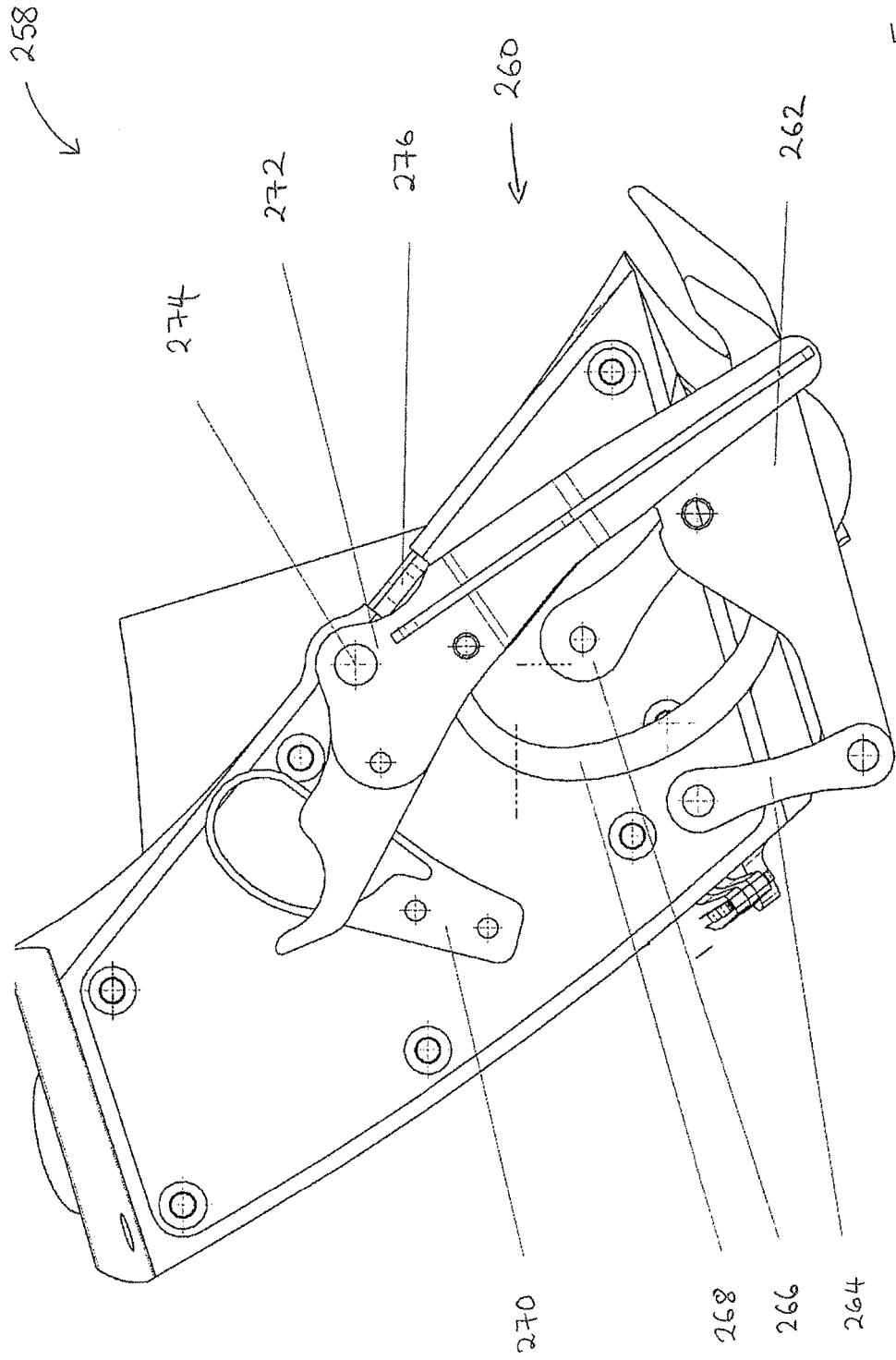
FIG. 13 illustrates a rear view of a further guide in a first configuration according to various examples.
Figure 14:
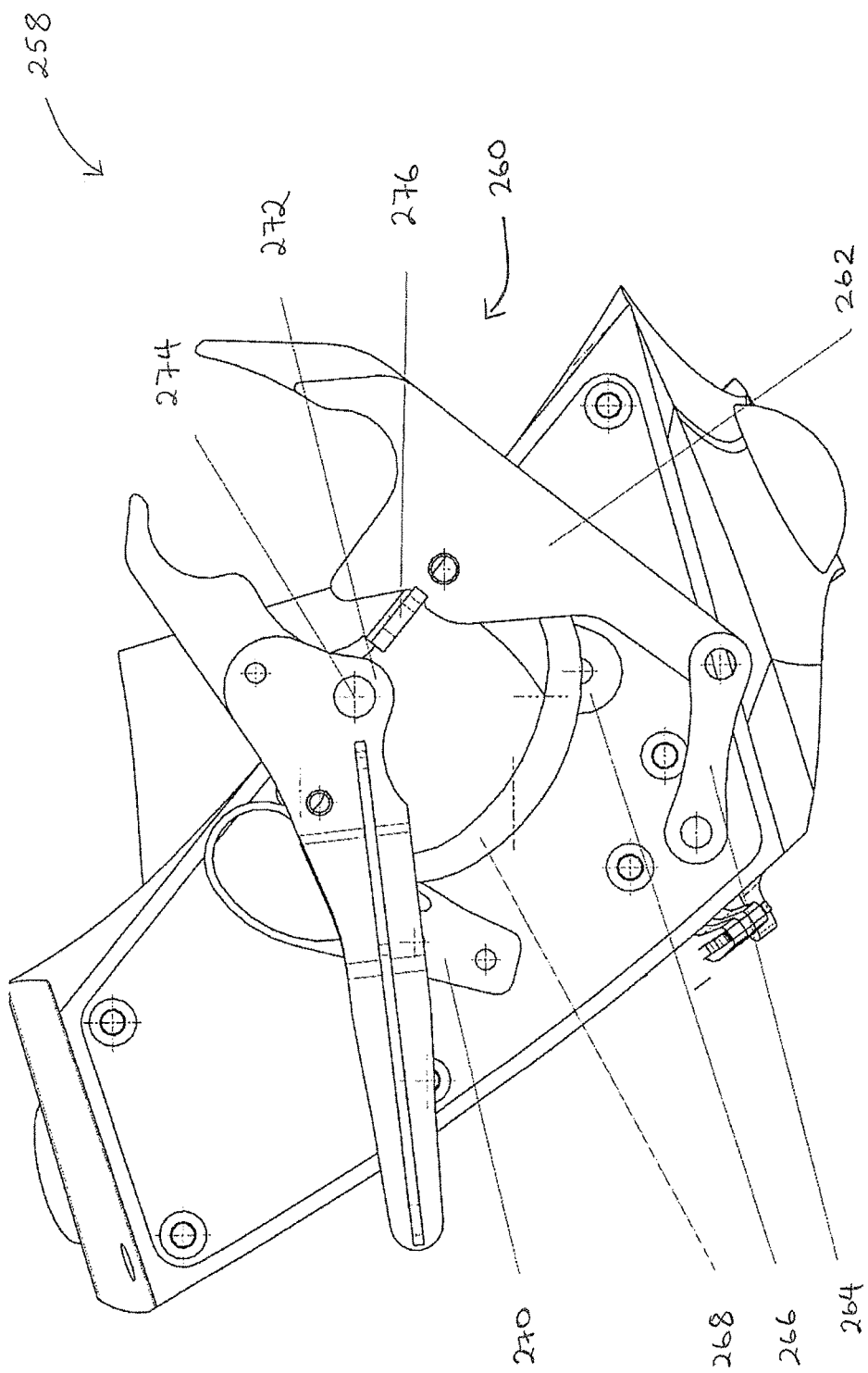
FIG. 14 illustrates a rear view of the guide illustrated in FIG. 13 in a second configuration.
Figure 15:
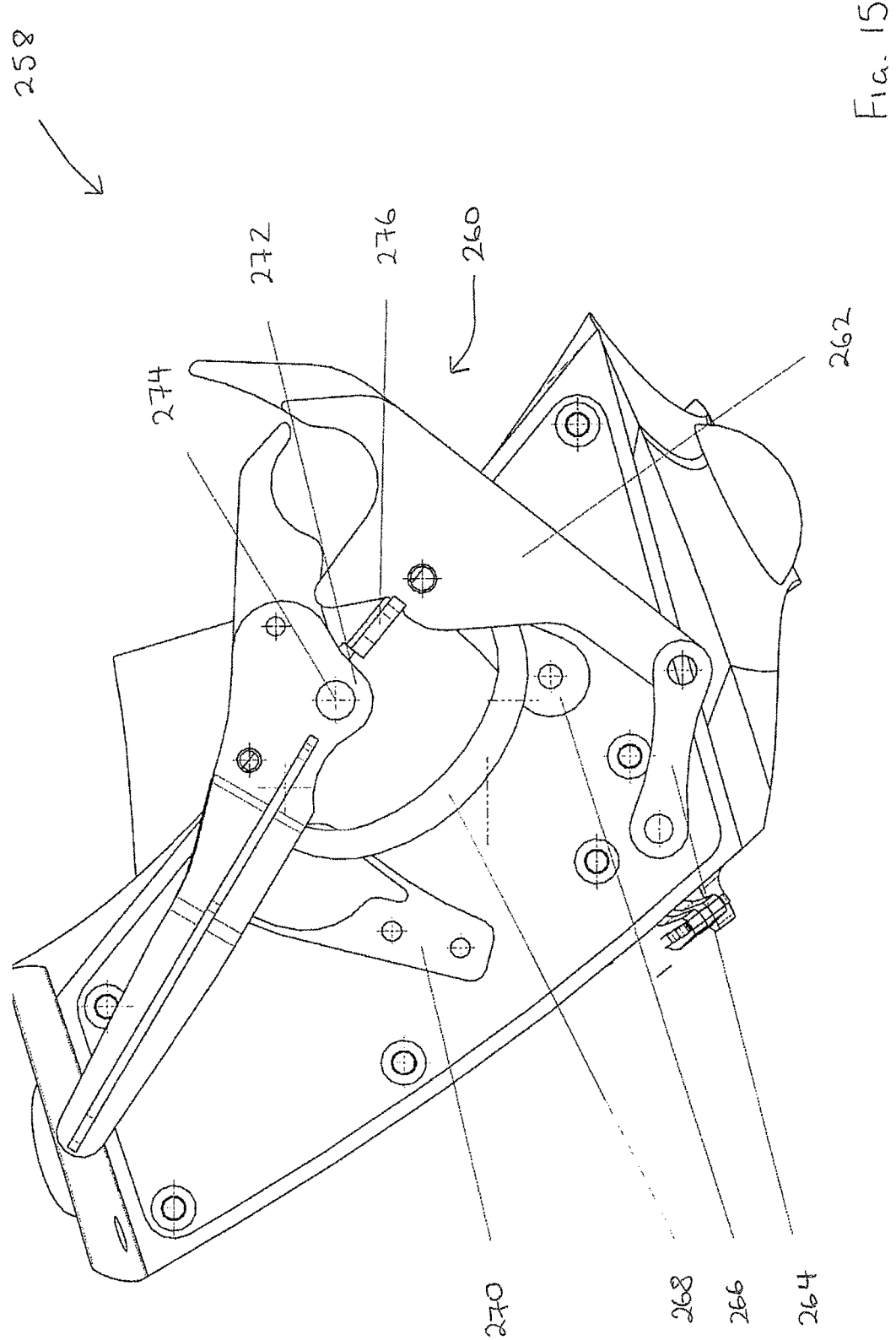
FIG. 15 illustrates a rear view of the guide illustrated in FIGS. 13 and 14 in a third configuration.

FIGS. 13, 14 and 15 illustrate rear views of a further guide 258 according to various examples. The guide 258 is similar to the guides 58, 158 and where the features are similar, the same reference numerals are used. The guide 258 differs from the guides 58, 158 in that the second fastener 160 does not include the detent 92 and the second lock 94 previously described. Instead, the second fastener 160 comprises a cradle 262, cradle guide arms 264, 266, a spring 268, a detent 270, a hand lever 272, a pivot 272 and a cradle stop 276.

The hand lever 272 is configured to rotate about the pivot 272 and during operation may rotate approximately one hundred and fifty degrees clockwise from the configuration illustrated in FIG. 13.

In operation, the guide 258 may be manipulated past the fan and into an aperture between engine section stator (ESS) vanes where the hand lever 272 is fully anti-clockwise as illustrated in FIG. 13 (in other words, the guide 258 is inserted into the gas turbine engine 10 in the first configuration illustrated in FIG. 13). The guide 258 is then inserted fully and locked in place as previously described. The drive assembly 36, 136 may then be offered to an adjacent engine section stator (ESS) aperture and be partially inserted, as previously described.

The hand lever 272 is then moved to the second configuration illustrated in FIG. 14. During this operation, the spring 268 acts on the cradle guide arm 266 as a rigid link, rotating the cradle guide arm 266 about its pivot point. This operation causes the cradle 262 to swing out and upwards, guided by the cradle guide arms 264 and 266, until the cradle 262 contacts the cradle stop 276.

It should be appreciated that the cradle guide arms 264, 266 are of unequal length and are not parallel. This results in motion of the cradle 262 that does not follow a simple arc and may result in the guide 258 having a relatively small 'footprint' as viewed from the rear of the guide 258. The relatively small footprint of the guide 258 may advantageously allow easy manipulation of the guide 258 past the fan blades 13 of the gas turbine engine 10 without the components of the guide 258 contacting the fan blades 13.

At the point where the cradle 262 contacts the cradle stop 276, an element of the hand lever 272 contacts the detent 270 thereby allowing the guide 258 and the drive assembly 36, 136 to be stable in this intermediate position.

Insertion of the Drive assembly 36, 136 then continues and is completed in the same manner as described in the preceding paragraphs, using the cradle 262 as a guide. Once the drive assembly 36, 136 is fully inserted, the hand lever 272 is rotated further clockwise, past the detent 270. The spring 268 stretches elastically, pulling the cradle 262 more firmly against the cradle stop 276.

Towards the end of movement of the lever 272, the pivot point 274 and the two pivot points of the spring 268 align. The pivot point of the spring 268 attached to the lever 272 then moves 'over-centre', thus pulling the lever 272 further clockwise without external influence. The shorter element of the lever 272 then contacts the elongate body 38, 138 reaching the position shown in FIG. 15.

The elongate body 38, 138 is therefore 'pinched' between the cradle 262 and the shorter element of the lever 268, holding the elongate body 38, 138 and thus the drive assembly 36, 136 securely in place.

The guide 258 advantageously leaves the engine section stator (ESS) aperture anticlockwise of the aperture occupied by guide 258 (that is, the aperture through which the drive assembly 36, 136 is to be inserted) completely clear to allow unhindered insertion of drive assembly 36, 136. Additionally, the guide 258 advantageously provides intermediate support of the elongate body 38, 138 during insertion of Drive assembly 36, 136, once the drive head of the drive assembly 36, 136 has entered the aperture, without clamping or restraining the elongate body 38, 138. Furthermore, the guide 258 may allow relatively easy one handed operation, at arm's length and without a good view of the guide 258 and drive assembly 36, 136 by the operator. The guide 258 may achieve this via movement of the single lever 272, rotating about the single pivot point 274.

Except where mutually exclusive, any of the features may be employed separately or in combination with any other features and the disclosure extends to and includes all combinations and sub-combinations of one or more features described herein.

The invention claimed is:

1. Apparatus to enable rotation of a compressor, the apparatus comprising:
a guide for insertion through a fan of a gas turbine engine to the compressor, the guide including:
a surface configured to guide a drive head of a drive assembly through an interior portion of the gas turbine engine to the compressor, the drive head defining a housing for a belt and a plurality of teeth that extend outwardly from the belt; and
a first fastener configured to fasten the guide to the gas turbine engine.

2. Apparatus as claimed in claim 1, wherein the guide is elongate and includes a first end and a second opposite end.

3. Apparatus as claimed in claim 2, wherein the first end of the guide defines a channel configured to receive a first member of the drive assembly to at least partially fasten the drive assembly to the guide, the first member protruding from the drive head and including a first portion extending from the drive head and a second portion extending from the first portion, the second portion having a greater width than the first portion.

4. Apparatus as claimed in claim 2, wherein the first fastener comprises a lever arranged to enable fastening and unfastening of the guide to the gas turbine engine, the lever being positioned at the second end of the guide.

5. Apparatus as claimed in claim 1, wherein the guide defines a cavity arranged to receive a vane of the gas turbine engine therein.

6. Apparatus as claimed in claim 5, wherein the cavity includes a notch to facilitate movement of the guide within the gas turbine engine and into position relative to the compressor.

7. Apparatus as claimed in claim 1, wherein the guide comprises a second fastener arranged to fasten the drive assembly to the guide to prevent relative movement between the drive assembly and the guide.

8. Apparatus as claimed in claim 1, wherein the guide further comprises at least one bushing for contacting the gas turbine engine during insertion of the guide to the gas turbine engine to prevent the guide from causing damage to the gas turbine engine.

9. Apparatus as claimed in claim 8, further comprising at least one resilient member mounting the at least one bushing to the guide.

10. Apparatus as claimed in claim 1, further comprising the drive assembly, the drive assembly configured for insertion into the gas turbine engine to rotate the compressor, the drive assembly comprising a first member to engage a channel in a first end of the guide.

11. Apparatus as claimed in claim 10, wherein the drive assembly further comprises:
an elongate member; and
a second member protruding outwardly from the elongate member to contact the guide during insertion of the drive assembly into the gas turbine engine to prevent relative movement between the drive assembly and the guide, the contact between the second member and the guide being indicative that the drive assembly is to be rotated to align the drive assembly with blades of the compressor.

12. Apparatus as claimed in claim 11, wherein the guide defines an open aperture though which the drive assembly is insertable, wherein the second member of the drive assembly contacts the guide at the open aperture prior to rotation, and the second member does not contact the guide at the open aperture subsequent to rotation.

13. A method to enable rotation of a compressor, the method comprising:
inserting a guide through a fan of a gas turbine engine to the compressor, the guide including:
a surface configured to guide a drive head of a drive assembly through an interior portion of the gas turbine engine to the compressor, the drive head defining a housing for a belt and a plurality of teeth that extend outwardly from the belt; and
operating a first fastener to fasten the guide to the gas turbine engine.

14. A method as claimed in claim 13, further comprising: inserting a drive assembly into the gas turbine engine using the guide to rotate the compressor and at least partially fastening the drive assembly to the guide by moving a first member of the drive assembly into a channel defined within the guide, the first member protruding from the drive head and including a first portion extending from the drive head and a second portion extending from the first portion, the second portion having a greater width than the first portion.

15. A method as claimed in claim 14, further comprising: rotating the drive assembly subsequent to a second member of the drive assembly contacting the guide at an open aperture of the guide.

16. A method as claimed in claim 14, further comprising: operating a second fastener to fasten the drive assembly to the guide to prevent relative movement between the drive assembly and the guide.

17. A drive assembly for rotating a compressor of a gas turbine engine, the drive assembly comprising:
a drive head including:
an engagement mechanism configured to engage and rotate blades of the compressor; and
a first member arranged to engage a channel in a first end of a guide to at least partially fasten the drive assembly to the guide,
wherein the drive head defines a housing for a belt and a plurality of teeth that extend outwardly from the belt.

18. A drive assembly as claimed in claim 17, further comprising a second member to contact the guide during insertion of the drive member into the gas turbine engine to prevent relative movement between the drive assembly and the guide, the contact between the second member and the guide being indicative that the drive assembly is to be rotated to align the drive assembly with the blades of the compressor.

* * * * *